(12) United States Patent
Glover et al.

(10) Patent No.: US 11,113,315 B2
(45) Date of Patent: Sep. 7, 2021

(54) SEARCH KEYWORD GENERATION

(71) Applicant: Branch Metrics, Inc., Redwood City, CA (US)

(72) Inventors: Eric J. Glover, Palo Alto, CA (US); Jyotsna Jayaraman, San Francisco, CA (US)

(73) Assignee: Branch Metrics, Inc., Redwood City, CA (US)

( * ) Notice: Subject to any disclaimer, the term of this patent is extended or adjusted under 35 U.S.C. 154(b) by 312 days.

(21) Appl. No.: 16/395,398

(22) Filed: Apr. 26, 2019

(65) Prior Publication Data

US 2019/0332612 A1 Oct. 31, 2019

Related U.S. Application Data

(60) Provisional application No. 62/663,418, filed on Apr. 27, 2018.

(51) Int. Cl.
*G06F 16/28* (2019.01)
*G06F 16/242* (2019.01)

(52) U.S. Cl.
CPC ........ *G06F 16/285* (2019.01); *G06F 16/2448* (2019.01); *G06F 16/288* (2019.01)

(58) Field of Classification Search
CPC ... G06F 16/285; G06F 16/2448; G06F 16/288
See application file for complete search history.

(56) References Cited

U.S. PATENT DOCUMENTS

| 7,165,024 B2 | 1/2007 | Glover et al. |
| 2013/0290318 A1 | 10/2013 | Shapira et al. |
| 2016/0147765 A1 | 5/2016 | Glover |

*Primary Examiner* — James Trujillo
*Assistant Examiner* — J Mitchell Curran
(74) *Attorney, Agent, or Firm* — RMCK Law Group PLC

(57) ABSTRACT

A method includes acquiring application data for applications. The application data specifies an application category and includes application words that describe the application. The method includes determining, for each application word, a global fraction value that indicates the fraction of applications with the application word, a category fraction value that indicates the fraction of applications in the category with the application word, and a ratio value that indicates the ratio of the category fraction value to the global fraction value. The method includes classifying application words as categorical words when the ratio value is greater than a ratio threshold. The method includes identifying similar applications and setting categorical words as categorical search keywords for applications when the categorical words are in greater than a threshold number of similar applications. The method further includes receiving a query and generating search results based on matches between the query and categorical search keywords.

22 Claims, 9 Drawing Sheets

SEARCH KEYWORD GENERATION

CROSS-REFERENCE TO RELATED APPLICATIONS

This application claims the benefit of U.S. Provisional Application No. 62/663,418, filed on Apr. 27, 2018. The disclosure of the above application is incorporated herein by reference in its entirety.

FIELD

The present disclosure relates to providing search results for applications.

BACKGROUND

Software developers develop a wide range of applications that are accessed by users on a variety of different platforms, such as different computing devices and operating systems. Example applications may include e-commerce applications, media streaming applications, business review applications, social media applications, and news applications. Application search engines can search for applications for a user. For example, a user can enter a search query into an application search engine and receive application search results for the search query in a search engine results page. The search results can include links to download the applications.

SUMMARY

In one example, a method comprises acquiring, at a computing device, application data for a plurality of applications. The application data for each application specifies one of a plurality of application categories and includes application words that describe the application. The method comprises determining a global fraction value, a category fraction value, and a ratio value for each of the application words. The global fraction value indicates the fraction of applications in the plurality of applications that include the application word. The category fraction value indicates the fraction of applications in the associated category that include the application word. The ratio value indicates the ratio of the category fraction value to the global fraction value for the application word. The method comprises classifying application words as categorical words when the ratio value associated with the application words is greater than a ratio threshold. For each application, the method comprises identifying similar applications based on similarity between the application words for the application and the application words for the similar applications. For each application, the method comprises setting categorical words as categorical search keywords for the application when the categorical words are included in greater than a threshold number of similar applications. The method further comprises receiving a search query from a user device and identifying search result applications based on matches between terms of the search query and categorical search keywords associated with the search result applications. The method further comprises sending, from the computing device, search results to the user device including download links for the search result applications.

In one example, a system comprises one or more storage devices and one or more processing units. The one or more storage devices are configured to store application data for a plurality of applications. The application data for each application specifies one of a plurality of application categories and includes application words that describe the application. The one or more processing units are configured to execute computer-readable instructions that cause the one or more processing units to determine a global fraction value, a category fraction value, and a ratio value for each of the application words. The global fraction value indicates the fraction of applications in the plurality of applications that include the application word. The category fraction value indicates the fraction of applications in the associated category that include the application word. The ratio value indicates the ratio of the category fraction value to the global fraction value for the application word. The one or more processing units are configured to classify application words as categorical words when the ratio value associated with the application words is greater than a ratio threshold. For each application, the one or more processing units are configured to identify similar applications based on similarity between the application words for the application and the application words for the similar applications. For each application, the one or more processing units are configured to set categorical words as categorical search keywords for the application when the categorical words are included in greater than a threshold number of similar applications. Additionally, the one or more processing units are configured to receive a search query from a user device and identify search result applications based on matches between terms of the search query and categorical search keywords associated with the search result applications. The one or more processing units are configured send search results to the user device including download links for the search result applications.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

A keyword generation system 100 (hereinafter "keyword system 100") of the present disclosure assigns search keywords to applications. The search keywords can be used to surface relevant applications in response to a search, such as a search for applications to download and/or open on a user device. For example, an application search system 102 can use the search keywords to identify applications to present to a user for download and installation on a user device (e.g., a mobile device). As another example, a search application on a user device (e.g., a mobile device) can use the search keywords to return search results for opening an application to a homepage or a specific application state (e.g., application page).

Applications can be associated with a variety of text, such as application title words, application description words, and application review words. All words associated with an application are not necessarily relevant when searching for the application. For example, the presence of a word in the application description does not guarantee that the word is relevant to the application. In a specific example, many application descriptions may include the acronym GPS (global positioning system), although many applications are directed to functionality that is not focused on GPS data. For example, "GPS" may not be a highly relevant search keyword for a camera application or a data backup application, whereas "GPS" may be a relevant search keyword for a mapping/directions application.

The keyword system 100 can assign different types of search keywords to applications. The different types of assigned search keywords may be relevant to the applications in different ways. In one example, the keyword system 100 can assign categorical search keywords that may be popular within an application's category. As another example, the keyword system 100 can assign app-specific keywords (e.g., application title words) that are specific to the application. Using the different types of search keywords assigned by the keyword system 100, a search system/application can provide relevant search results to a user.

Figure 1:
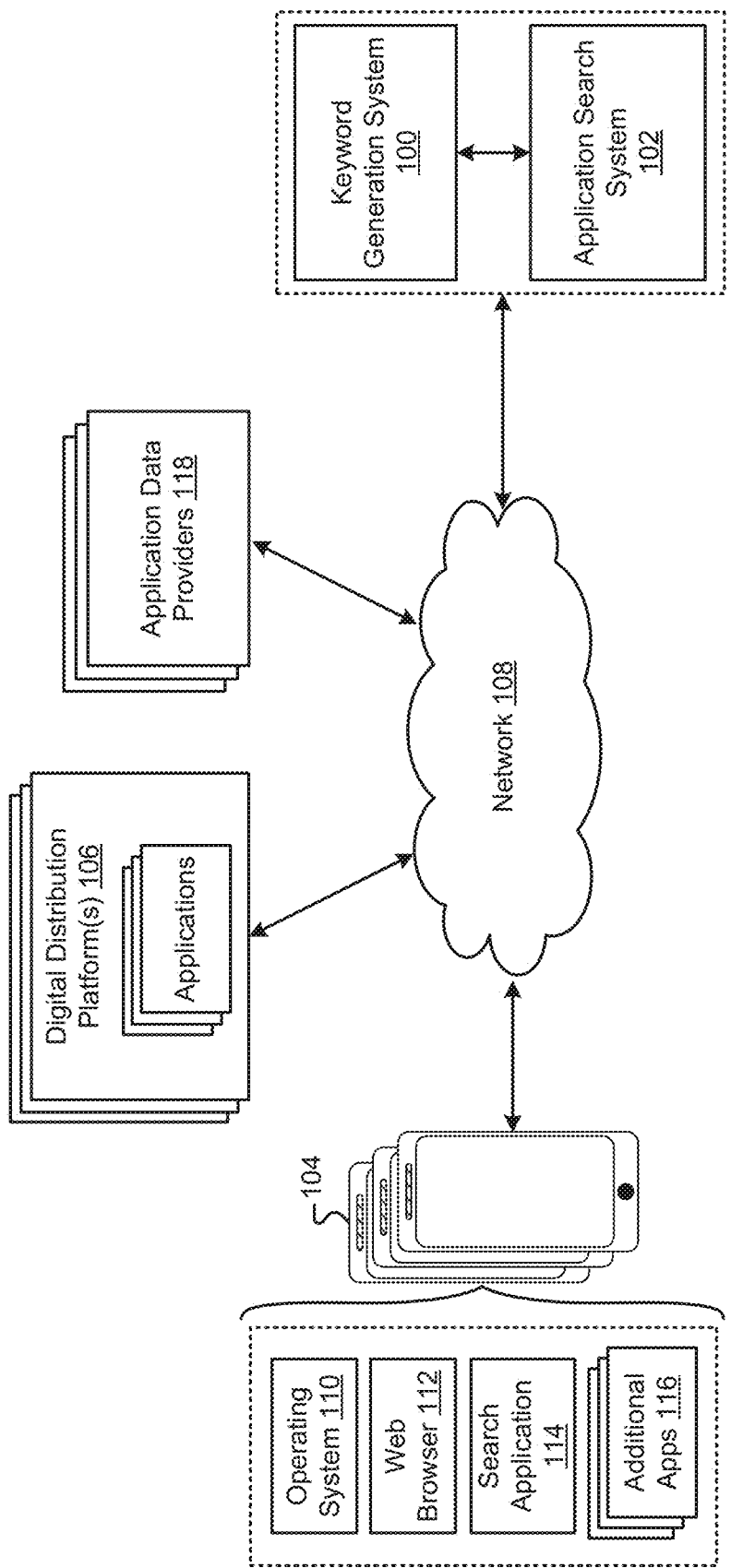
FIG. 1 illustrates an environment that includes a plurality of user devices that communicate with a remote application search system.

FIG. 1 illustrates an environment that includes a plurality of user devices 104 that may communicate with a remote application search system 102 (e.g., a search server) and digital distribution platforms 106 via a network 108. The application search system 102 (hereinafter "search system 102") can provide search results to the user devices 104 (e.g., in response to a search query). For example, the search results may include a list of applications, such as applications that can be accessed on the user device 104 and/or downloaded from the digital distribution platforms 106. The user devices 104 may include a variety of different computing devices, such as a handheld computing device (e.g., a smartphone or tablet), a laptop computing device, and a desktop computing device. The network 108 may include various types of computer networks, such as a local area network (LAN), wide area network (WAN), and/or the Internet. Example digital distribution platforms 106 include, but are not limited to, the GOOGLE PLAY® digital distribution platform by Google, Inc. and the APP STORE® digital distribution platform by Apple, Inc.

FIG. 1 also includes a keyword system 100 that can generate search keywords for a plurality of applications. For example, the keyword system 100 may generate search keywords that the search system 102 can use to generate search results. In a specific example, the keyword system 100 can generate a search index (e.g., an inverted index) for applications in which each application is associated with a set of search keywords that the search system 102 can access to generate search results. In this specific example, the search system 102 may receive a search query and then select and/or rank the search results based on matches between the search query and the search keywords in the search index. The search system 102 may select and/or rank the search results based on additional factors, such as popularity metrics associated with the applications, which may include a download metric and/or an activity metric (e.g., monthly active users for the applications). In some implementations, the search functionality attributed to the search system 102 herein may be implemented on the digital distribution platforms 106 instead of as a third party search system for the digital distribution platforms 106.

The user devices 104 may include an operating system 110, one or more web browsers 112, a search application 114, and additional installed applications 116. In some implementations, a user device 104 may access the search system 102 using the web browser 112, such as via a search interface on a webpage and/or via a search add-on to the web browser 112 (e.g., a web browser plugin). In some implementations, a user device 104 may include the dedicated search application 114 that may communicate with the search system 102. Additionally, or alternatively, the search application functionality may be included elsewhere on the user device 104, such as within one or more additional installed applications.

Figure 2:
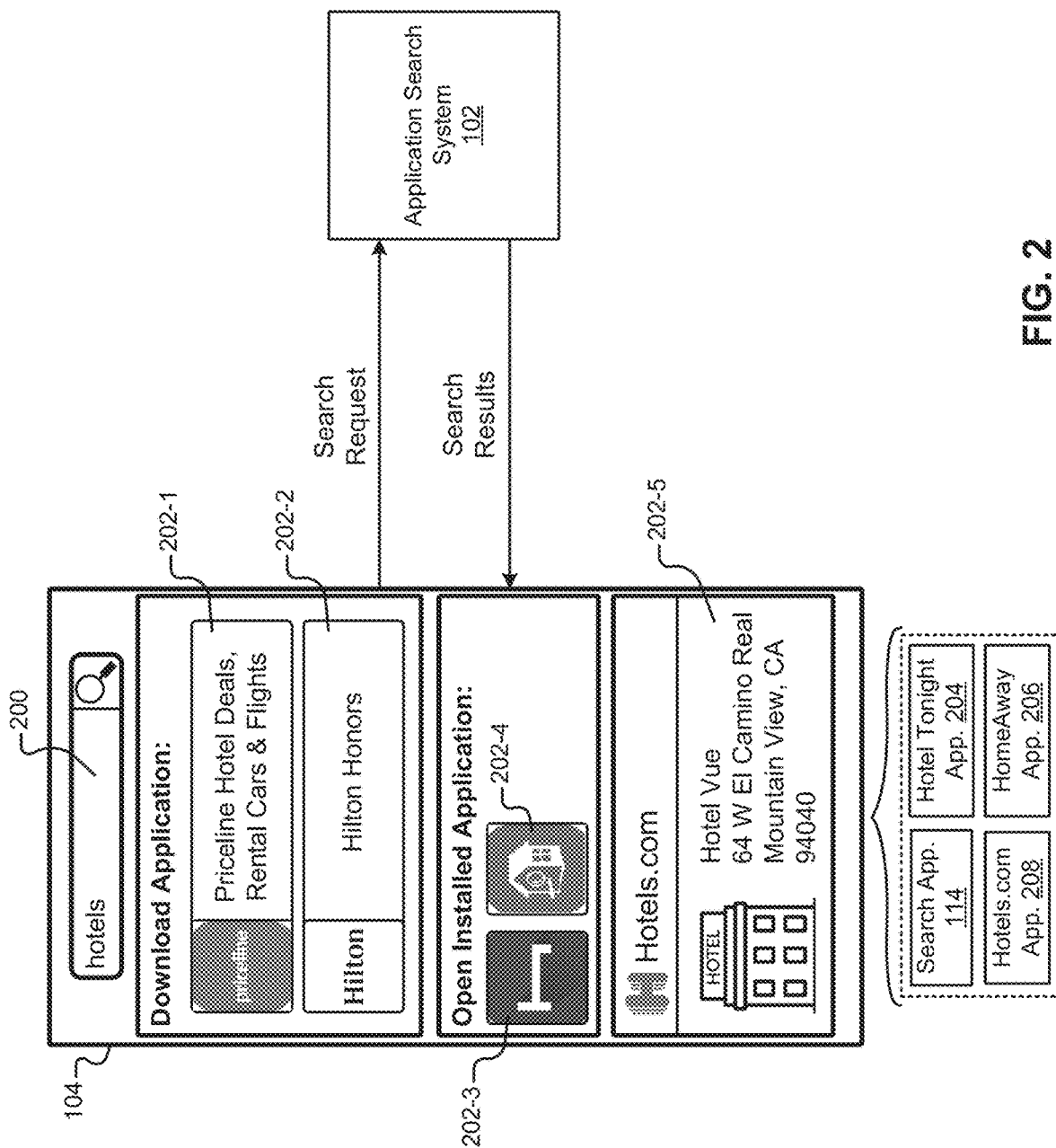
FIG. 2 illustrates an example search graphical user interface (GUI).

FIG. 2 illustrates an example search graphical user interface (GUI) that the search application 114 may generate. Although the search application 114 may generate the GUI in FIG. 2, in other implementations, the GUI may be generated by the web browser application 112 according to an accessed web search server. The search GUI includes a search GUI element (e.g., a search box 200) into which a user can enter a search query (e.g., "hotels"). The user can enter the search query and transmit the search query to the search system 102 in a search request, which may include additional search parameters (e.g., a user geolocation). The search system 102 can return search results in response to the search request.

The search results include a list of application links 202-1, 202-2, . . . , 202-5 that the user can select (e.g., touch/click). For example, the search system 102 may return search results that include a list of applications that the user may download from a digital distribution platform. In FIG. 2, the download search results may include links 202-1, 202-2 (e.g., hyperlinks) for downloading the PRICELINE® travel application developed by Booking Holdings Inc. and the HILTON® hotel reservation application developed by Hilton Worldwide Holdings Inc. from the digital distribution platform. Selecting the user selectable download links 202-1, 202-2 may cause the user device 104 to access the digital distribution platform pages in the search application 114 or web browser application 112, at which time the user can decide whether to download the applications.

The list of applications for download can include applications that were selected by the search system 102 based on matches between the search keywords associated with the applications and terms of the search query. For example, the search system 102 may have identified the PRICELINE® and HILTON® applications based on matches between the search query and search keywords associated with the PRICELINE® and HILTON® applications. The size of the application list in the search results may vary based on the number of applications that match the search query.

Although the search system 102 may store the search keyword index and generate search results based on the search keyword index, in some implementations, the search keyword index (e.g., a portion of the index) may be stored on the user device 104 locally. In these implementations, the search application 114 may perform the search locally on the user device 104 (e.g., without contacting the remote search system 102) and generate the search results locally. For example, in FIG. 2, the search application 114 generated search results for opening installed applications. The installed applications include the HOTEL TONIGHT® hotel reservation application 204 developed by Hotel Tonight, Inc., the HOMEAWAY® vacation rental application 206 developed by Expedia Group, Inc., and the HOTELS-.COM® hotel reservation application 208 developed by Expedia Group, Inc.

The user may select one of the user-selectable icons/links 202-3, 202-4, 202-5 to access the installed applications 204, 206, 208. Selecting the links for the installed applications may cause a variety of different actions to occur on the use device 104. In general, selecting the links may cause the user device 104 to launch the application. The application may be launched to a home state of the application in some examples. For example, selecting the HOTEL TONIGHT® application icon 202-3 or the HOMEAWAY® application icon 202-4 may cause the applications to launch to the respective homepages. As another example, the HOTEL TONIGHT® application 204 and/or the HOMEAWAY® application 206 may be launched to a predetermined page (e.g., a search page). Selection of the HOTELS.COM® application link 202-5 may cause the HOTELS.COM® application to open and access the Hotel Vue link specified in the rendered search result link.

Figure 3:
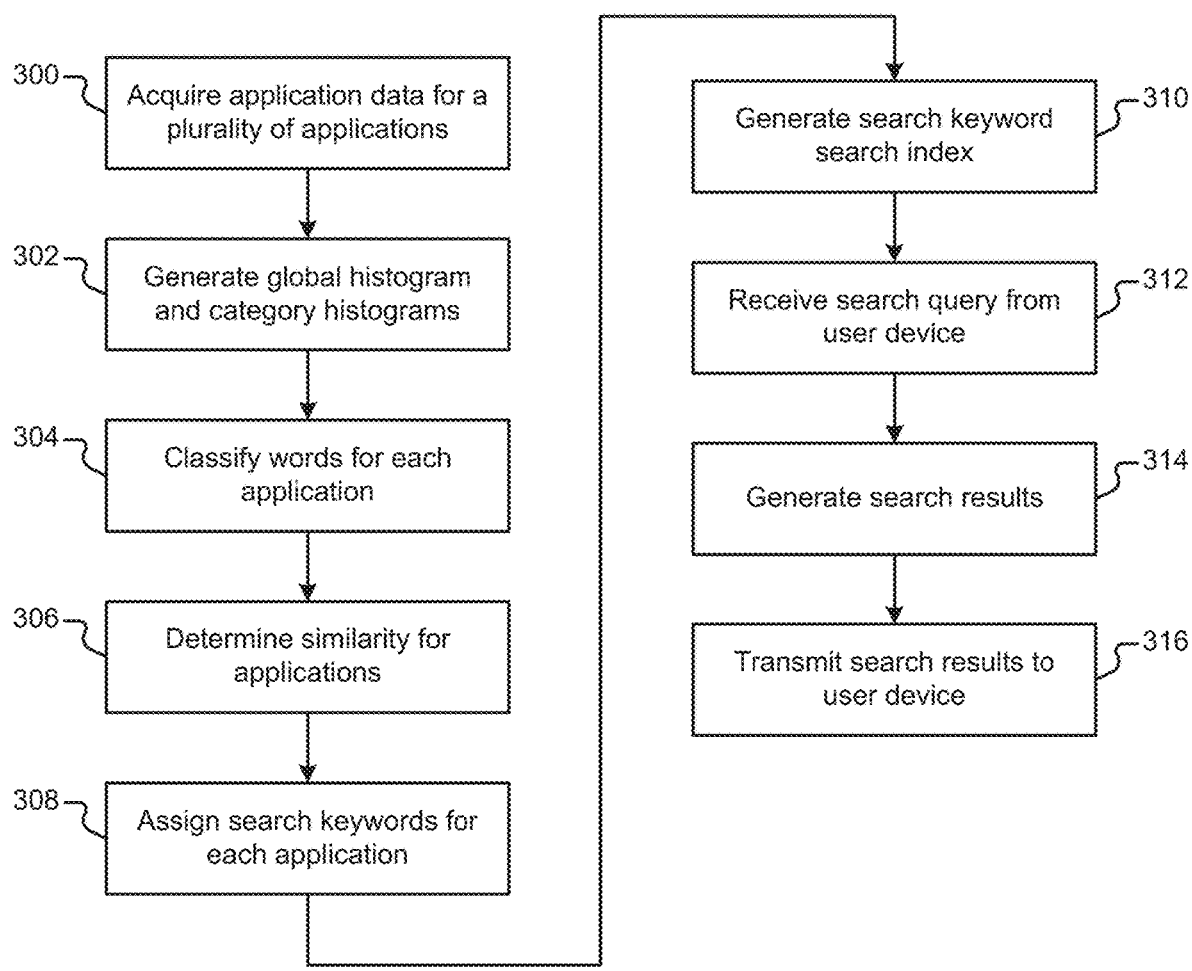
FIG. 3 illustrates an example method that describes operation of an example keyword system, application search system, and a user device.

FIG. 3 illustrates a method that describes operation of the keyword system 100, the search system 102, and a user device 104. For example, the method describes generation of the search keywords and application searching based on the generated search keywords. The method of FIG. 3 is described with respect to the functional block diagrams of FIGS. 4-9.

Figure 4:
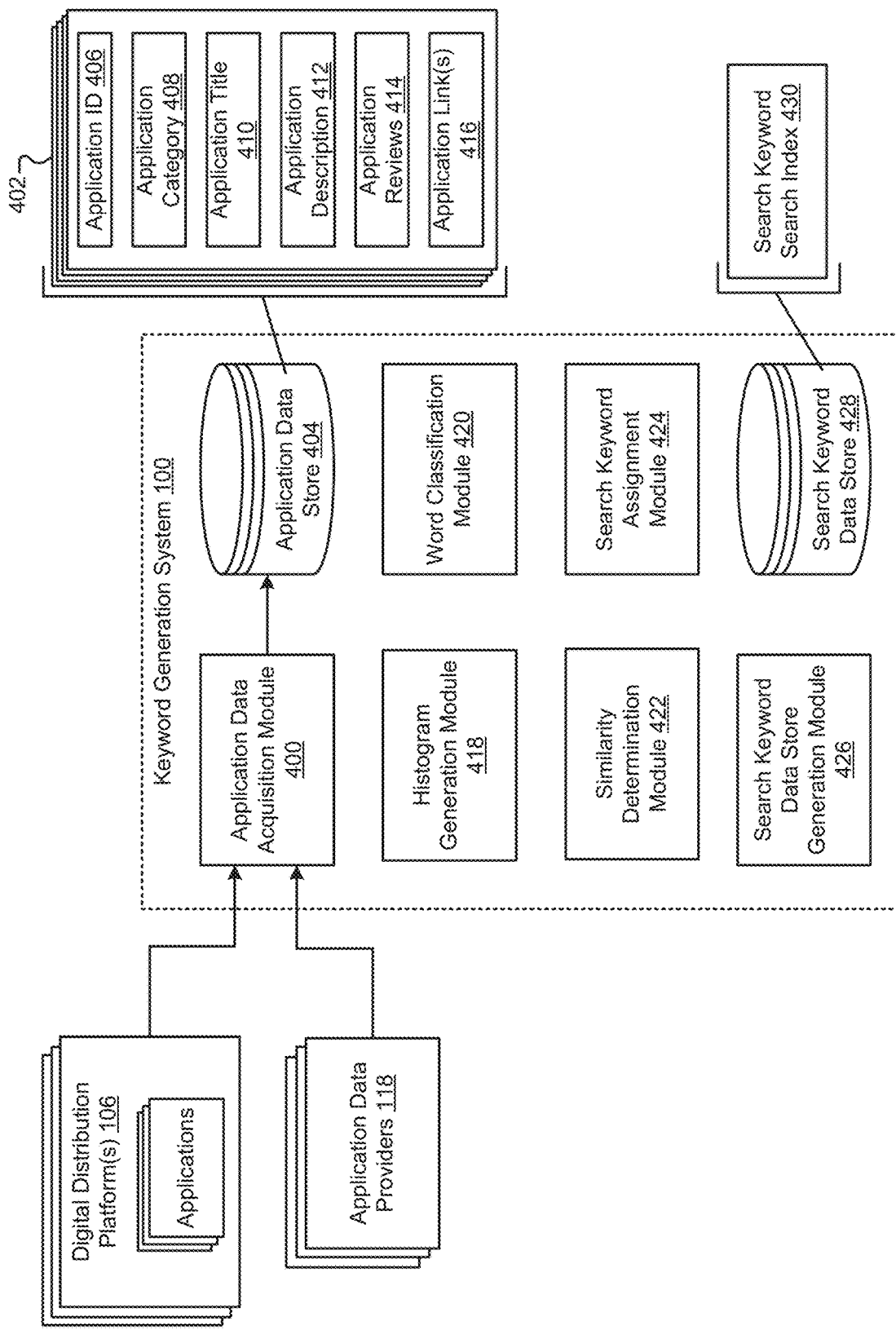
FIG. 4 illustrates an example keyword generation system.
Figure 5:
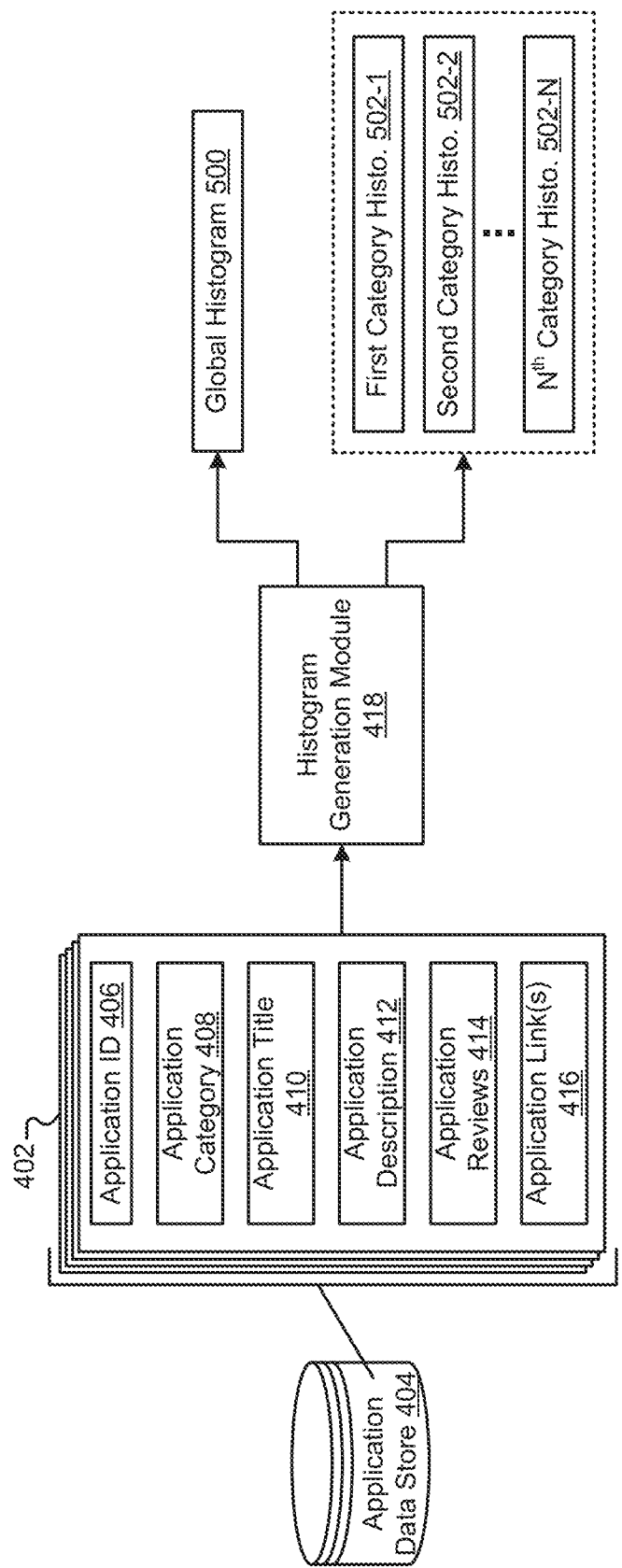
FIG. 5 illustrates an example histogram generation module that generates a global histogram and a plurality of category histograms.
Figure 6:
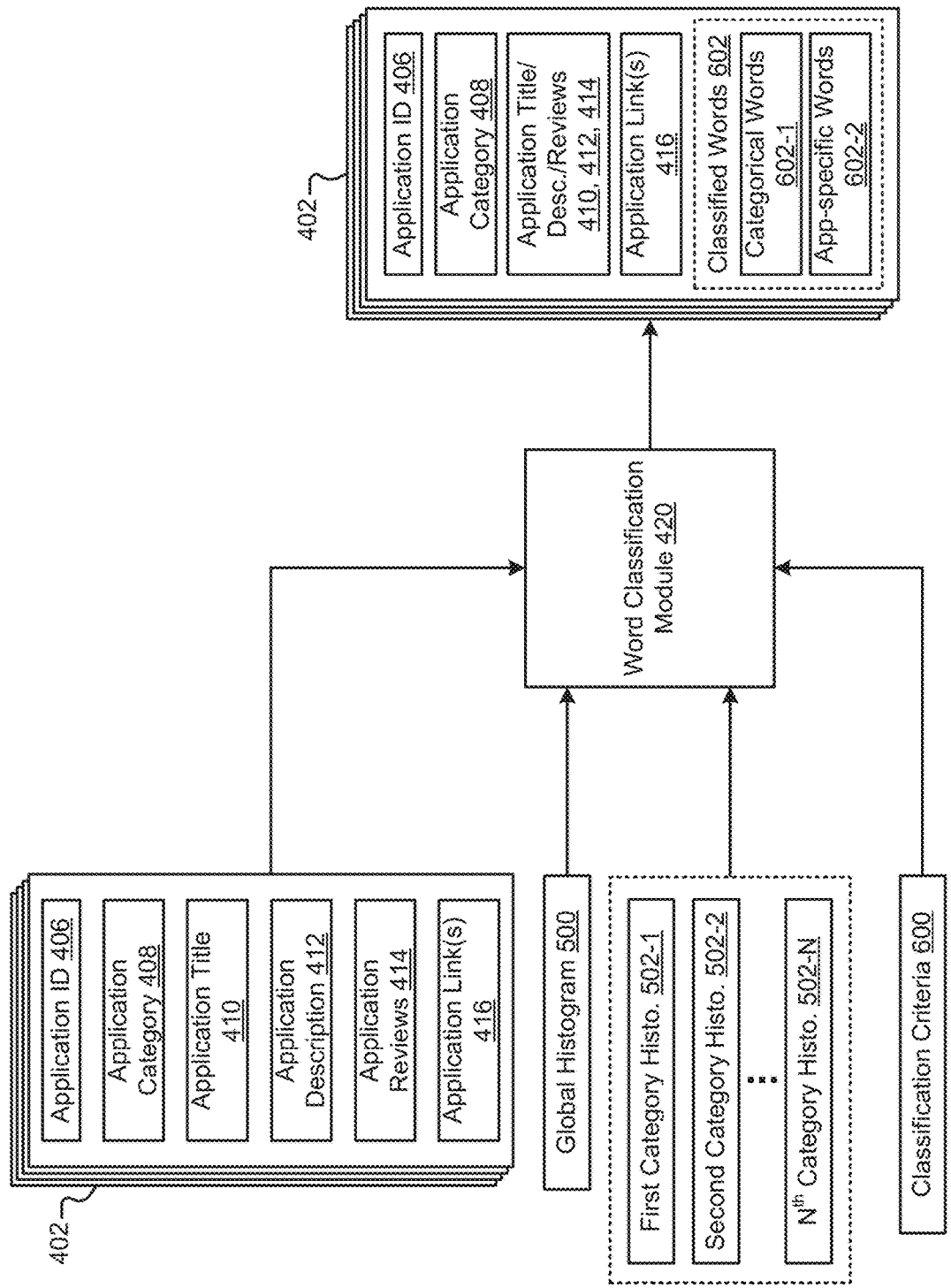
FIG. 6 illustrates an example word classification module that classifies words for each application.

Initially, in block 300, the keyword system 100 acquires application data for a plurality of applications (e.g., tens of thousands of applications). FIG. 4 illustrates example application data acquisition. In FIG. 4, the application data acquisition module 400 (hereinafter "data acquisition module 400") may acquire and process the application data.

The data acquisition module 400 may acquire application data from a variety of sources. In some implementations, the data acquisition module 400 may acquire application data from one or more of the digital distribution platforms 106 (e.g., from pages for downloading the applications). In some implementations, the data acquisition module 400 may acquire application data from one or more application data providers 118. The application data providers 118 may include developers of the applications and/or services that provide application data (e.g., for a fee or as part of a partnership). An example application data provider 118 may include Apptopia, Inc. of Boston, Mass.

The data acquisition module 400 may generate a plurality of application data records 402 (hereinafter "application records 402") that each include application data for an individual application. An application data store 404 stores the plurality of application records 402. In addition, the application data store 404 may store additional data generated based on the data included in the application records 402 (e.g., histograms).

The application record 402 includes an application ID 406 that may uniquely identify the application associated with the application record 402. In some implementations, the data acquisition module 400 may acquire the application IDs from sources that are external to the keyword system 100, such as digital distribution platforms 106 and/or application data providers 118. In some implementations, the data acquisition module 400 may assign application IDs that are internal to the keyword system 100 and the search system 102.

The application record 402 includes an application category 408 to which the application belongs. The applications may be assigned a category from a plurality of possible categories. Example categories may include, but are not limited to, Shopping, Beauty, Dating, House & Home, Food & Drink, Art & Design, Libraries & Demo, Auto & Vehicles, Trivia, Comics, Parenting, Music, Casino, Weather, Word, Events, Maps & Navigation, Board, Video Players & Editors, Racing, Social, Card, Finance, Strategy, Medical, Communication, Photography, Role Playing, Business, Travel & Local, Action, News & Magazines, Simulation, Arcade, Adventure, Health & Fitness, Productivity, Educational, Tools, Lifestyle, Personalization, Books & Reference, Puzzle, Music & Audio, Entertainment, Casual, Education, and Sports.

Example applications in the Maps & Navigation category may include, but are not limited to, the WAZE® application, the UBER® application, and the LYFT® application. Example applications in the Music & Audio category may include, but are not limited to, the PANDORA® application, the SPOTIFY® application, and the YOUTUBE® music application.

In some implementations, the data acquisition module 400 may acquire the application categories from sources that are external to the keyword system 100, such as digital distribution platforms 106 and/or application data providers 118. In some implementations, the data acquisition module 400 may assign internal categories to the applications.

The application record 402 includes an application title 410 (i.e., an application name). The application title 410 may be provided by the application developer. The application record 402 includes an application description 412. The application description 412 may include information related to the application. For example, the application description 412 may include words and numbers that describe the application. The application description 412 may include structured text/numbers and/or free form text and numbers that describe the application (e.g., application functionality and features). The application description 412 may be provided by the application developer (e.g., on the application download page).

In some implementations, the application record 402 may include application reviews 414 provided by users. For example, the data acquisition module 400 may acquire the reviews 414 from the application download page and/or other sites. In some implementations, the application record 402 may include one or more application links 416. Application links 416 may include links (e.g., hyperlinks) for downloading the application on one or more digital distribution platforms 106 and/or opening the application on the user device 104. In some implementations, the application records 402 may include additional information related to the applications, such as the user ratings for the applications (e.g., a number of stars) and download numbers for the application indicating the number of times the application has been downloaded.

The complete set of applications for which data is stored in the application data store 404 may be referred to herein as a "global set of applications." The global set of applications may be the set of applications for which the search system 102 can search and provide search results to the user. Each of the applications in the global set of applications may be assigned one of a plurality of categories. As such, the global set of applications may include multiple sets of categorical applications, such as a first categorical set of applications, a second categorical set of applications, etc. In some cases, the global set of applications may include millions of applications (e.g., approximately 2 million applications). Each category may include different numbers of applications. In some cases, categories can each include tens of thousands of applications.

The keyword system 100 may generate search keywords for a variety of different search implementations. For example, the keyword system 100 may generate search keywords for different digital distribution platform search engines and different device search applications. In general, the keyword system 100 may be configured to generate search keywords according to how the search system using the generated search keywords will be implemented. For example, the keyword system 100 may be configured to generate search keywords for search systems associated with different applications and different numbers of applications. In a specific example, the keyword system 100 may be configured in different manners to generate search keywords for different digital distribution platforms that include different applications. The categories for applications can also differ, depending on the implementation of the keyword system and the search system.

Referring to FIG. 3, in block 302, the keyword system 100 generates a global histogram 500 and a plurality of category histograms 502-1, 502-2, . . . , 502-N (collectively "category histograms 502"). For example, with reference to FIGS. 4-5, the keyword system 100 can include a histogram generation module 418 that generates the global histogram 500 and the plurality of category histograms 502 based on the application data (e.g., the application records 402). In addition to keeping track of the words and counts (e.g., in the histograms), the keyword system 100 may also keep track of the number of applications that attributed to each histogram.

The global histogram 500 may indicate the number of occurrences of words across the global set of applications. For example, the histogram generation module 418 may treat each application as a bag of words generated from the application data (e.g., application title 410 and application description 412), where the bag of words captures each word once. The histogram generation module 418 may increment the global histogram 500 for each word in the bag of words associated with the application. Put another way, the histogram generation module 418 may increment a word count once for each application that includes the word, without regard to the number of times the word appears within the application. As such, the global histogram 500 may indicate, for each word, the number of applications that include one or more instances of the word.

Each category histogram 502 may indicate the number of occurrences of words in application records 402 within the respective category. For example, the histogram generation module 418 may generate a category histogram 502 based on the occurrences of words associated with the applications within the category. In a manner similar to global histogram generation, the histogram generation module 418 may treat each application as a bag of words generated from the application data (e.g., the application title 410 and description 412), where the bag of words captures each word once. The histogram generation module 418 may then increment a category histogram for each word in the bag of words associated with the application in the category. Put another way, the histogram generation module 418 may increment a word count once for each application in the application category that includes the word, without regard to the number of times the word appears within the application. As such, a category histogram may indicate, for each word, the number of applications in the category that include one or more instances of the word.

In a specific example, an application may have the title "Eric's Wacky App," a description "This wacky app does something cool. Cool is what it does." This example application may have a bag of words containing: erics, wacky, app, this, does, something, cool, is, what, it. If the application is in the category "Photo and Video," then each word in the bag of words would increment the global histogram and the "Photo and Video" category histogram once.

Referring to FIG. 3, in block 304, the keyword system 100 classifies words for each application. For example, with respect to FIG. 4 and FIG. 6, the keyword system 100 may include a word classification module 420 (hereinafter "classification module 420") that classifies words for each application. For each application, the classification module 420 may use application data (e.g., the title and description words of the application), the global histogram 500, the corresponding category histogram 502, and other classification criteria 600 to classify the words of the application. The classified words 602 may be included in the application record 402.

In one example described herein, the classification module 420 may classify the application words as categorical words or app-specific words. The categorical words 602-1 and app-specific words 602-2 may be stored in the application record 402. The categorical words may be words that are relatively popular in the category. For example, categorical words may generally refer to words that are more common within the application's category than across the global set of applications. The categorical words may describe key features or properties of an application. App-specific words may be relevant words that are included in very few applications. In some implementations described herein, the classification module 420 may classify application words into more than two categories (e.g., broad categorical, medium categorical, and app-specific categories).

Instead of classifying all words of the application record 402, in some implementations, the classification module 420 may discard some application words. For example, the classification module 420 may discard words that occur too frequently in the global histogram. For example, the classification module 420 may discard stop words.

The classification module 420 may classify words according to classification criteria 600. The classification criteria 600 may define various global and categorical values that the classification module 420 can use to classify the application words. For example, the classification criteria 600 may include various global and categorical counts, fractions, and threshold values that the classification module 420 uses to determine how to classify the application words. The owner/operator of the keyword system 100 and the search system 102 may set the classification criteria 600 to suit their particular implementation. In some implementations, the keyword system 100 may include modules (not shown) that automatically modify the classification criteria 600 over time. In some cases, words may be manually classified and/or included/excluded by the owner/operator of the keyword system 100.

The classification module 420 may classify words of the application record 402 (e.g., words in the title and description) based on the number of applications that include the word globally and/or the number of applications that include the word within a category. In general, the classification module 420 may classify words as categorical words if the words are sufficiently more present (e.g., by fraction) in a category of applications than the words are in the global set of applications. The classification module 420 may use a ratio threshold value to make the determination of whether a word should be classified as categorical. In general, the classification module 420 may classify words as app-specific words if the words rarely occur in the global set of applications. The classification module 420 may use an app-specific classification threshold value (e.g., number or fraction of applications in the global set of applications) to determine whether a word should be classified as app-specific.

In some implementations, the classification module 420 may classify a word as categorical when the fraction of applications that include the word within a category relative to the fraction of applications that include the word in the global set of applications is greater than a category ratio threshold value. In these implementations, the classification module 420 may calculate a global fraction value, a category fraction value, and a category ratio value to make the determination of whether a word is categorical. An example category ratio threshold value may be in the single digits (e.g., 2-3), although any values may be chosen, depending on the implementation.

To determine the global fraction value, the classification module 420 may initially determine the number of applications in the global set that include the word (e.g., according to the global histogram 500). The classification module 420 may then divide the number of applications that include the word by the total number of applications in the global set to determine the global fraction value. To determine the category fraction value, the classification module 420 may initially determine the number of applications in the category that include the word (e.g., according to the categorical histogram 502). The classification module 420 may then divide the number of applications that include the word by the total number of applications in the category to determine the category fraction value. The classification module 420 may then determine a category ratio value for the category by dividing the category fraction value by the global fraction value. The classification module 420 may classify a word as categorical if the category ratio value is greater than the category ratio threshold value. Put another way, the classification module 420 may classify a word as categorical if the ratio of the category fraction value to the global fraction value is greater than the category ratio threshold value.

In some implementations, the classification criteria 600 may include additional criteria for categorizing a word as categorical. For example, the classification criteria 600 may also include an occurrence criterion that specifies how often a word should occur in the category and/or globally. For example, the classification criteria 600 may indicate that a word should appear a threshold number of times in a category and/or globally. As another example, the classification criteria 600 may indicate that a word should appear in greater than a threshold fraction of applications within a category and/or globally. In these examples, the classification module 420 may classify a word as categorical if the category ratio threshold value is satisfied and the word appears a specified number of times (e.g., the category fraction value is greater than a fraction value threshold). An example fraction value threshold may be on the order of 1-10% (e.g., 2-3%). Implementing such criteria may prevent the assignment of categorical keywords that are not common in the category.

The classification module 420 may classify words as app-specific when the words occur in relatively few applications. In some implementations, the classification criteria 600 for classifying a word as app-specific may include one or more threshold values that define a maximum allowable occurrence for the app-specific word. For example, the classification criteria 600 may define an app-specific classification threshold value (e.g., a number or fraction of applications), below which a word is classified as app-specific. In these examples, the classification module 420 may classify a word as app-specific if the word occurs less than specified by the app-specific classification threshold value. Example app-specific classification threshold values may define a maximum global count/fraction and/or a maximum category count/fraction. In a specific example for an app-specific classification threshold value that defines a maximum global fraction value, the classification module 420 may classify a word as app-specific if the fraction of applications in the global set is less than the app-specific classification threshold value (e.g., a global fraction threshold value).

Referring back to FIG. 3, in block 306, the keyword system 100 determines similarity values for pairs of applications. For example, with respect to FIG. 4 and FIG. 7, the keyword system 100 may include a similarity determination module 422 (hereinafter "similarity module 422") that determines similarity values between applications. The similarity value for a pair of applications may indicate how similar the two applications are to one another.

Figure 7:
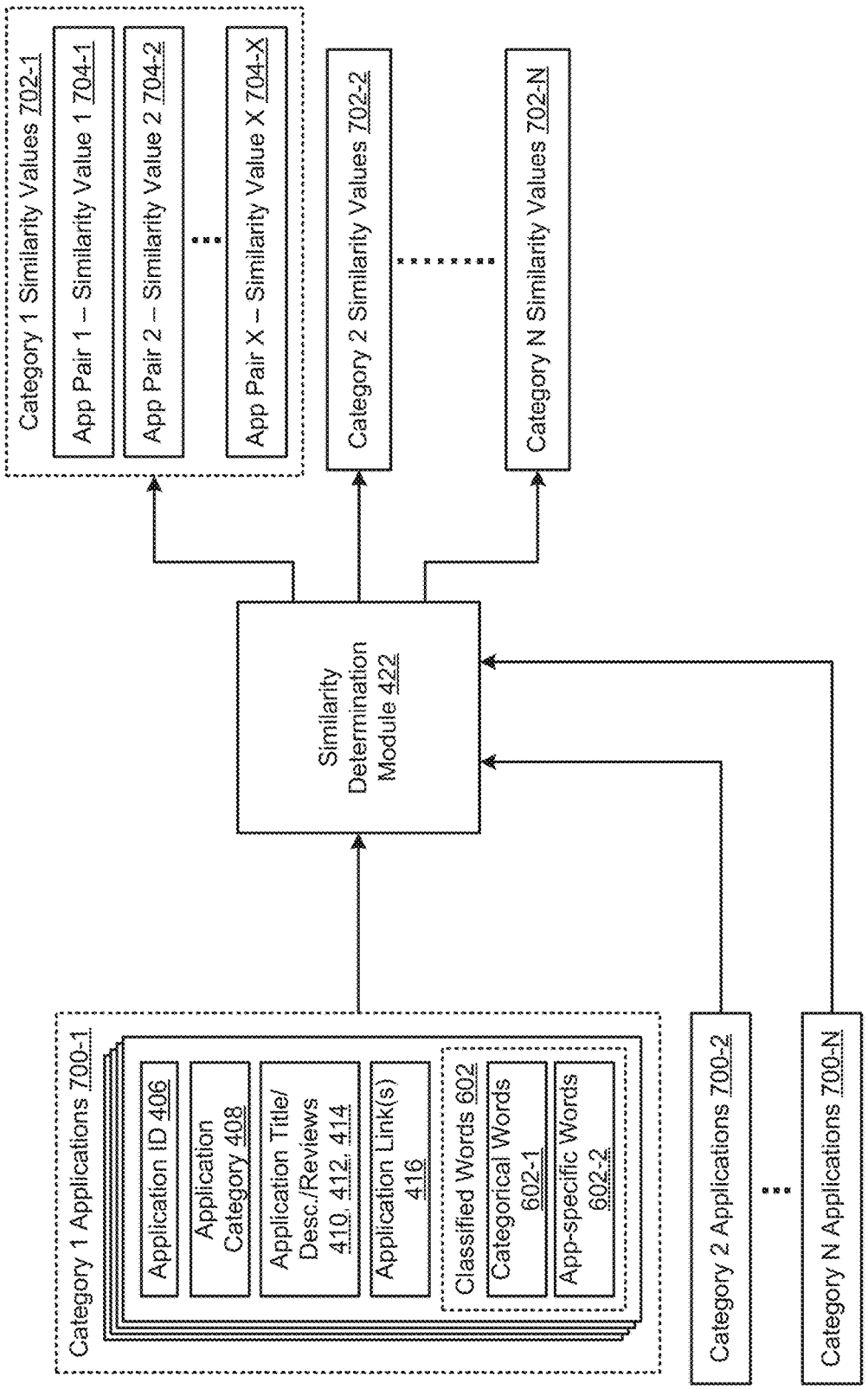
FIG. 7 illustrates an example similarity determination module that determines similarity values between applications that indicate how similar the applications are to one another.
Figure 8:
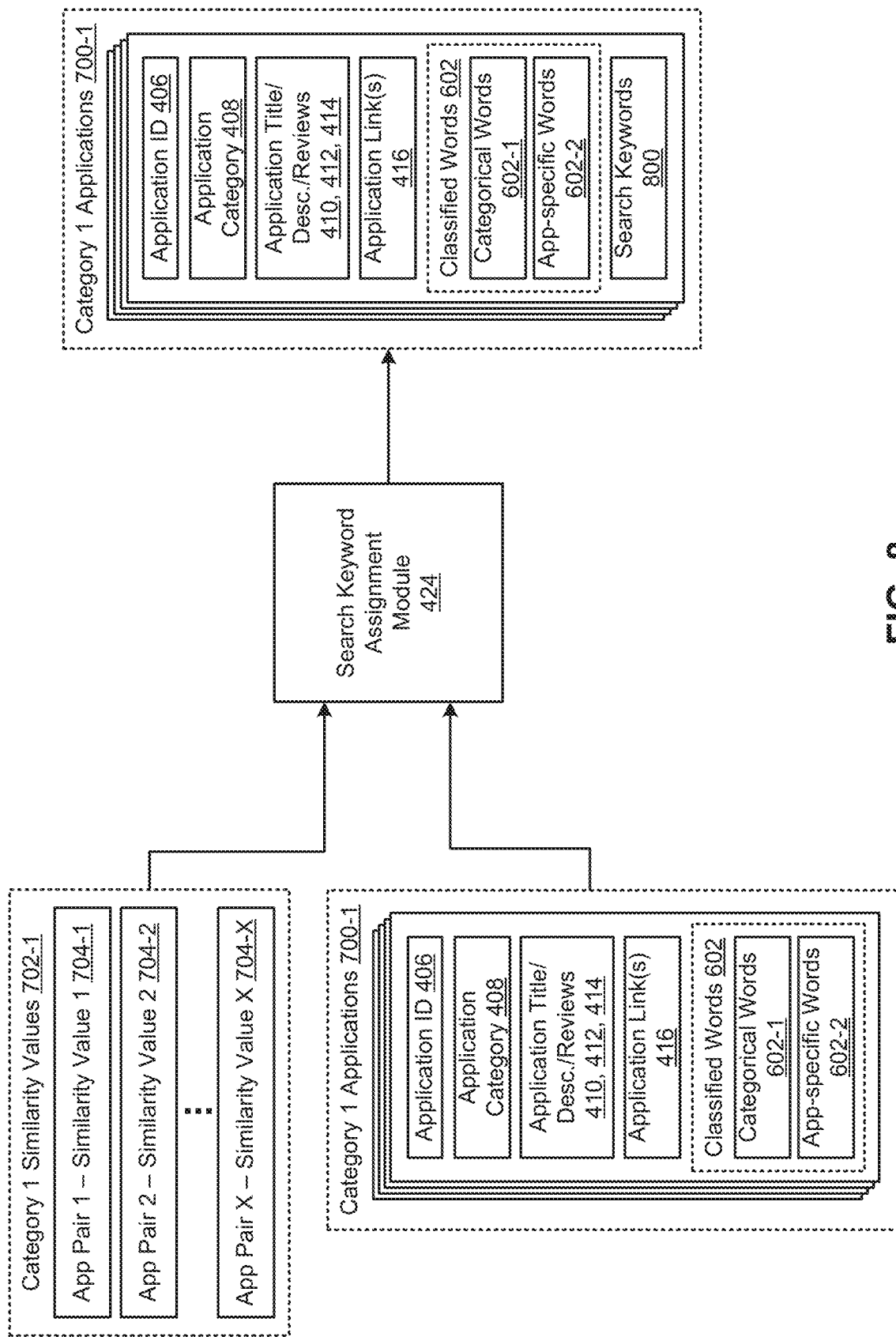
FIG. 8 illustrates an example search keyword assignment module that assigns search keywords to applications.
Figure 9:
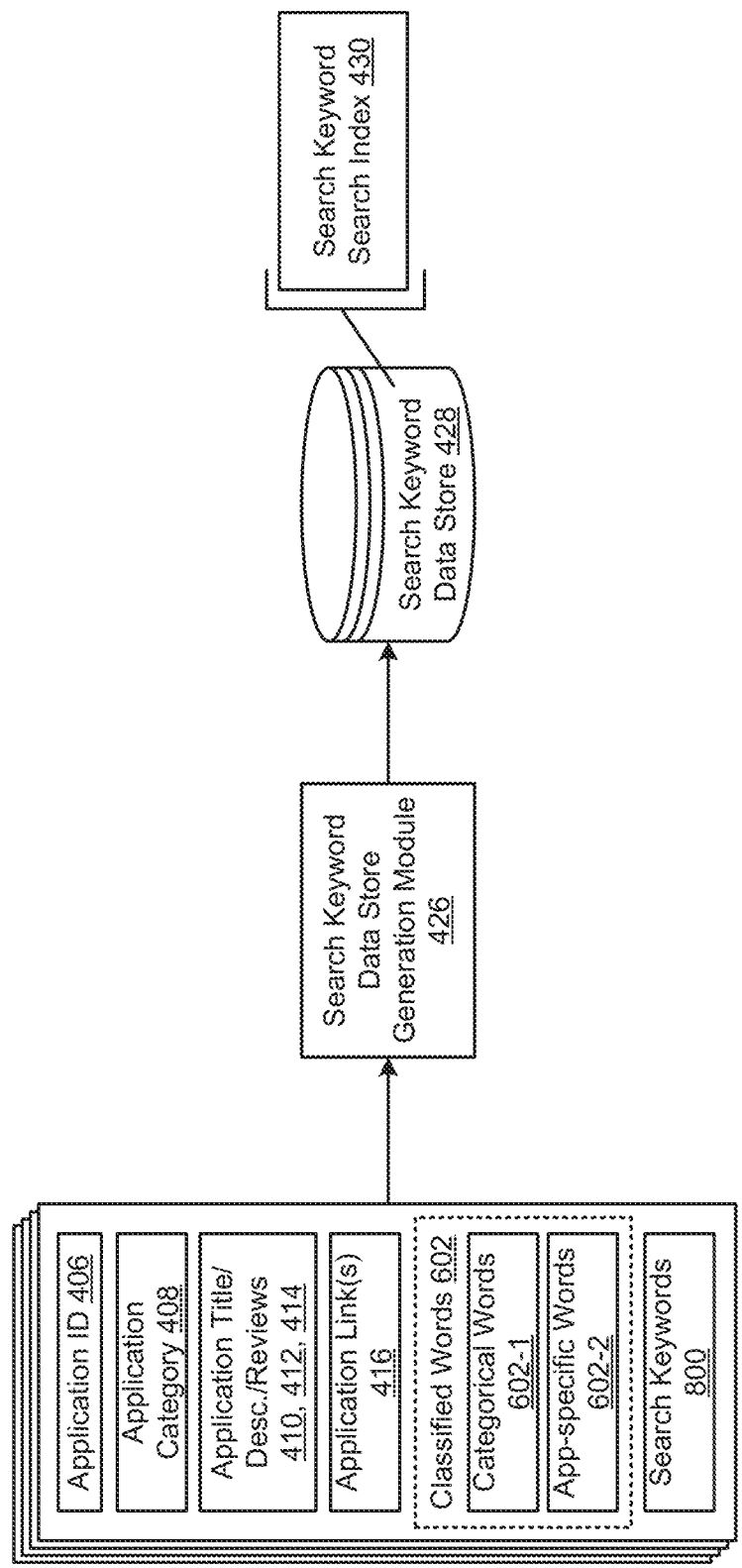
FIG. 9 illustrates a search keyword data store generation module that generates a search index based on the search keywords.

In some implementations, the similarity module 422 may determine similarity between applications within the global set. In other implementations, the similarity module 422 may limit the similarity determinations to applications within the same category. For example, for each category, the similarity module 422 may determine the similarity of one application to each other application in the same category. Limiting similarity calculations to applications within the same category can reduce computational complexity of the similarity calculations. In FIG. 7, the similarity module 422 determines similarity values for applications within the categories. Specifically, the similarity module 422 calculates similarity values for N categories of applications 700-1, 700-2, . . . 700-N (category similarity value sets 702-1, 702-2, . . . , 702-N). Within category 1 702-1, the similarity module 422 calculates similarity values for X different application pairs (app pairs 704-1, 704-2, . . . , 704-X).

The similarity module 422 may determine similarity between applications based on the classified words 602 in the application records 402. For example, if words are classified as categorical words, the similarity module 422 may determine similarity between applications based on the similarity between categorical words in the application records. As another example, the similarity module 422 may determine similarity between applications based on the similarity between categorical words and app-specific words in the application records. As another example, if words are classified as broad categorical, medium categorical, and app-specific, the similarity module 422 may determine similarity between applications based on the similarity between the broad categorical, medium categorical, and app-specific words in the application records. In some implementations, the similarity module 422 may perform preprocessing on the words prior to the similarity calculations, such as de-pluralizing words (e.g., children/child).

The similarity module 422 can determine a similarity value for two applications based on the number of matches between classified words in the two applications. In general, the similarity module 422 may determine larger similarity scores when there are more matches between the classified words. In some implementations, the similarity value may be between 0 and 1. In one example, the similarity module 422 may use cosine similarity to determine the similarity values. Cosine similarity can be used according to the following example equation:

$$\text{Cosine similarity} = (A \cdot B)/\|A\|\|B\| \text{ Where } A=\text{vector of app 1 and } B=\text{vector of app 2}$$

In some implementations, to calculate similarity values, a weighted term vector may be created for each application record. The term vector may be built by assigning a first weighting value to categorical words and second weighting value to app-specific words. In implementations including more classifications, the term vector can be built by assigning additional weighting values to the additional classifications.

In some implementations, the similarity module 422 may calculate similarity values in other ways. For example, the similarity module 422 may do separate similarity calculations for different classifications of words. In a specific example, the similarity module 422 may do first and second similarity calculations for categorical words and app-specific words, respectively. In this example, the similarity module 422 may calculate the final similarity value based on the first and second similarity values. For example, the similarity module 422 may set the final similarity value as the greater of the first and second similarity values. Alternatively, the final similarity value may be a function of the first and second similarity values, such as an average value or a value determined based on weightings of the different similarity values. In some implementations, the similarity module 422 may calculate similarity using all application words in the application record. In other implementations, document embeddings may be used to create a reduced dimensional vector for each application which is used for similarity calculation.

Referring to FIG. 3, in block 308, the keyword system 100 generates search keywords for each application. For example, with respect to FIG. 4 and FIG. 8, the keyword system 100 may include a search keyword assignment module 424 (hereinafter "keyword assignment module 424") that assigns search keywords to the applications. For example, the keyword assignment module 424 may select the search keywords for an application from the classified words in similar applications. The search keywords may be referred to according to their classifications (e.g., categorical search keywords, app-specific search keywords, etc.).

For each application, the keyword assignment module 424 can identify the most similar applications, such as a predetermined number of the most similar applications. For example, if similarity values for an application are determined across the global set of applications, the keyword assignment module 424 may identify a predetermined number/fraction of the most similar applications in the global set. In an implementation where similarity values for an application are determined across the application's category, the keyword assignment module 424 may identify a predetermined number/fraction of the most similar applications in the category. In some implementations, the keyword assignment module 424 may require that similar applications have a minimal level of similarity (e.g., a minimum similarity threshold value). The identified group of similar applications may provide a corpus of application words from which to select search keywords.

The keyword assignment module 424 selects an application for search keyword assignment. The keyword assignment module 424 can then select words from the most similar applications in the global set or categorical set, depending on the implementation. For example, for each classified word in the selected application, the keyword assignment module 424 may calculate the number (e.g., fraction) of similar applications (e.g., up to the 10 most similar) that also include that keyword. If the number (e.g., fraction) is greater than a minimum threshold value, then the keyword assignment module 424 may keep the word as a search keyword. In cases where there are no similar applications, the keyword assignment module 424 may use other rules to decide which, if any, keywords to keep as search keywords. In some implementations, the keyword assignment module 424 may assign words from similar applications that occur in greater than a minimum number of similar applications, regardless of whether the selected application includes the words. In these implementations, the set of search keywords for the selected application may be augmented with relevant search keywords from other similar applications.

The following are lists of example search keywords that may be associated with specific applications. The VENMO® mobile payment service application may include the following search keywords: account, card, banking, deposit, business, payments, money, pay, debit, financial, atm, venmo, funds, payment, view, secure, ious, convenient, balance, transferor, balances, cash, checks, fees, transaction, locations, accounts, buys, pursuant, nmls, bank, transmittal, transactions, security, services, track, bills, manage, transfers, send, transfer, and receive.

The FACEBOOK® social networking application may include the following search keywords: facebook, posts, meet, interests, social, groups, profile, private, people, and post. The EAT24® food ordering application may include the following search keywords: faster, eat24, takeout, reorder, food, pay, chuy, denny, arby, advance, tgi, easier, checkout, ordering, pickup, meal, credit, restaurants, order, qdoba, preorder, favorites, delivery, fridays, chang, restaurant, and order.

The WAZE® navigation application may include the following search keywords: road, accurate, conditions, waze, alerts, maps, live, route, voice, gas, gps, navigation, map, police, avoid, traffic, automatic, driving, tracking, and routing. The PANDORA® music streaming application may include the following search keywords: stations, pandora, albums, listening, listen, songs, exclusions, genres, playlists, music, quality, artists, audio, browse, radio, and mood.

Referring to FIG. 3, in block 310, the keyword system 100 generates a search index 430 (e.g., an inverted index) based on the search keywords. The search index 430 may be referred to herein as the "search keyword search index 430" or the "keyword search index 430." With respect to FIG. 4 and FIG. 9, the keyword system 100 may include a search keyword data store generation module 426 (hereinafter "data store generation module 426") that generates the keyword search index 430 based on the search keywords associated with the applications. The keyword search index 430 may be stored in the search keyword data store 428. The keyword search index 430 may include search keywords for each application. The search keywords may be indexed by application ID. In some implementations, the applications may each be associated with a popularity value (e.g., number of downloads and/or active users). For example, the applications may be sorted by the popularity value.

As described herein, the search system 102 may use the generated keyword search index 430 to perform application searches (e.g., in response to a received search query). Referring to FIG. 3, in block 312, the search system 102 receives a search query from a user device 104. In block 314, the search system 102 generates search results. For example, the search system 102 may generate search results based on matches between words in the search query and words included in the keyword search index 430. The search system 102 may select applications associated with the matched words and score/rank the applications. For example, the search system 102 may score/rank the applications based on the number of matches, among other factors. The search system 102 may include modules (not illustrated) and/or data stores (not illustrated) configured to provide the search functionality described herein. Although the search system 102 can search for applications based on the assigned search keywords, additionally/alternatively, the search system 102 can search for applications based on other data included in the search request, such as a geolocation of the user.

In some implementations, the search system 102 can generate a relevance score for each search result that indicates the relevance of the search result to the search query and context (e.g., geolocation). In one example, relevance scores may include decimal values (e.g., 0.000-1.000), where a larger relevance score indicates that the search result is more relevant to the search query and context. The search results can be ranked according to relevance scores associated with the search results, where search results associated with larger relevance scores may be ranked higher in the GUI. Additionally, in some implementations, the search results can be grouped by result type, such as application download links and application open links (e.g., see FIG. 2).

In some implementations, the search system/application 102, 114 can score the search results based on the search query. For example, the search system/application 102, 114 can score search results based on matches between the search query and search keywords associated with the search result. The search system/application 102, 114 can also score search results based on additional matches with application words and other factors, such as context data (e.g., geolocation).

In some implementations, the search system/application 102, 114 can implement scoring functions (e.g., weighted scoring functions) to generate relevance scores. In some cases, the search system/application 102, 114 can weight categorical words and app-specific words differently for the relevance scores. In some cases, the search system/application 102, 114 can also use the histogram data, ratios, or other values associated with the search keywords in relevance scoring.

In some implementations, the search system/application 102, 114 can implement one or more heuristic models that score/filter the search results. For example, a heuristic model may include rules associated with generating relevance scores. In some implementations, the search system/application 102, 114 may implement one or more machine learned scoring models to generate the relevance scores. Examples of machine learned models may include a Bayesian model, a logistic regression, a Neural Network, and/or a Gradient Boosted Decision Tree.

In block 316, the search system 102 transmits the search results to the user device 104. The user device 104 may display the search results to the user (e.g., see FIG. 2). Depending on the installation status of the application, the user can select (e.g., touch/click) the search results to: 1) access a digital distribution platform for downloading the application, 2) open the application, and/or 3) access the application state (e.g., application page) associated with the search result.

The data structures described herein may be updated over time according to the techniques described herein. For example, the application records, histograms, similarity values, search keywords, and the keyword search index may be updated over time in response to the addition/removal of applications.

Although the keyword system 100 is described herein as classifying application words into one or two classifications (e.g., categorical and/or app-specific), the keyword system 100 may classify application words into more than two classifications. For example, in some implementations, the keyword system 100 may classify application words as broad categorical words, medium categorical words, and app-specific words. In these implementations, the broad categorical words and app-specific words may be classified in the same manner described above. The medium categorical words may be classified using different threshold values, such as different threshold ratios (e.g., a threshold ratio lower than the category ratio threshold value). In this example, medium categorical words may be words that describe the application in general, but may be a little less significant than the categorical words for search keywords. For example, medium categorical words may be category specific, but not as broad as broad categorical words. The medium categorical words may also include a different minimum threshold for occurrences than the broad categorical words.

The modules and data stores may be embodied by electronic hardware and software components including, but not limited to, one or more processing units, one or more memory components, one or more input/output (I/O) components, and interconnect components. Interconnect components may be configured to provide communication between the one or more processing units, the one or more memory components, and the one or more I/O components. For example, the interconnect components may include one or more buses that are configured to transfer data between electronic components. The interconnect components may also include control circuits (e.g., a memory controller and/or an I/O controller) that are configured to control communication between electronic components.

The one or more processing units may include one or more central processing units (CPUs), graphics processing units (GPUs), digital signal processing units (DSPs), or other processing units. The one or more processing units may be configured to communicate with memory components and I/O components. For example, the one or more processing units may be configured to communicate with memory components and I/O components via the interconnect components.

A memory component may include any volatile or non-volatile media. For example, memory may include, but is not limited to, electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDD), magnetic tape drives, optical storage technology (e.g., compact disc, digital versatile disc, and/or Blu-ray Disc), or any other memory components.

Memory components may include (e.g., store) data described herein. For example, the memory components may include the data included in the data stores. Memory components may also include instructions that may be executed by one or more processing units. For example, memory may include computer-readable instructions that, when executed by one or more processing units, cause the one or more processing units to perform the various functions attributed to the modules and data stores described herein.

The I/O components may refer to electronic hardware and software that provides communication with a variety of different devices. For example, the I/O components may provide communication between other devices and the one or more processing units and memory components. In some examples, the I/O components may be configured to communicate with a computer network. For example, the I/O components may be configured to exchange data over a computer network using a variety of different physical connections, wireless connections, and protocols. The I/O components may include, but are not limited to, network interface components (e.g., a network interface controller), repeaters, network bridges, network switches, routers, and firewalls. In some examples, the I/O components may include hardware and software that is configured to communicate with various human interface devices, including, but not limited to, display screens, keyboards, pointer devices (e.g., a mouse), touchscreens, speakers, and microphones. In some examples, the I/O components may include hardware and software that is configured to communicate with additional devices, such as external memory (e.g., external HDDs).

In some implementations, the systems 100, 102 may include one or more computing devices that are configured to implement the techniques described herein. Put another way, the features attributed to the modules and data stores described herein may be implemented by one or more computing devices. Each of the one or more computing devices may include any combination of electronic hardware, software, and/or firmware described above. For example, each of the one or more computing devices may include any combination of processing units, memory components, I/O components, and interconnect components described above. The one or more computing devices of the systems 100, 102 may also include various human interface devices.

The one or more computing devices of the systems 100, 102 may be configured to communicate with the network 108 of FIG. 1. The one or more computing devices of the systems 100, 102 may also be configured to communicate with one another (e.g., via a computer network). In some examples, the one or more computing devices of the systems 100, 102 may include one or more server computing devices configured to communicate with user devices. The one or more computing devices may reside within a single machine at a single geographic location in some examples. In other examples, the one or more computing devices may reside within multiple machines at a single geographic location. In still other examples, the one or more computing devices of the systems 100, 102 may be distributed across a number of geographic locations.

What is claimed is:

1. A method comprising:
   acquiring, at a computing device, application data for a plurality of applications, wherein the application data for each application specifies one of a plurality of application categories and includes application words that describe the application;
   determining, at the computing device, a global fraction value, a category fraction value, and a ratio value for each of the application words, wherein the global fraction value indicates the fraction of applications in the plurality of applications that include the application word, wherein the category fraction value indicates the fraction of applications in the associated category that include the application word, and wherein the ratio value indicates the ratio of the category fraction value to the global fraction value for the application word;
   classifying, at the computing device, application words as categorical words when the ratio value associated with the application words is greater than a ratio threshold;
   for each application, identifying similar applications based on similarity between the application words for the application and the application words for the similar applications;
   for each application, setting categorical words as categorical search keywords for the application when the categorical words are included in greater than a threshold number of similar applications;
   receiving, at the computing device, a search query from a user device;
   identifying, at the computing device, search result applications based on matches between terms of the search query and categorical search keywords associated with the search result applications; and
   sending, from the computing device, search results to the user device including download links for the search result applications.

2. The method of claim 1, wherein the application words include an application title.

3. The method of claim 1, wherein setting categorical words as categorical search keywords for the application comprises adding categorical search keywords from similar applications.

4. The method of claim 1, wherein identifying similar applications comprises identifying similar applications in the same category based on the similarity between the categorical words in the application and the categorical words in the similar applications.

5. The method of claim 1, further comprising classifying application words as categorical words when the ratio value associated with the application words is greater than the ratio threshold and the category fraction value of the application words is greater than a fraction value threshold.

6. The method of claim 1, further comprising:
   classifying application words as application-specific words when the global fraction value associated with the application words is less than a global fraction threshold value;
   for each application, setting application-specific words as application-specific search keywords for the application; and
   identifying search result applications based on matches between terms of the search query and application-specific search keywords associated with the search result applications.

7. The method of claim 6, wherein identifying similar applications for each application comprises:
   identifying matches between the categorical words in the application and the categorical words in the similar applications; and
   identifying matches between the application-specific words in the application and the application-specific words in the similar applications.

8. The method of claim 7, further comprising, for each application pair:
   determining a first similarity value based on the identified matches between the categorical words;
   determining a second similarity value based on the identified matches between the application-specific words; and determining an application-pair similarity value for the application pair based on the first similarity value and the second similarity value.

9. The method of claim 1, wherein the identified similar applications include a predetermined number of the most similar applications.

10. The method of claim 1, further comprising:
classifying application words into a plurality of additional classifications based on the ratio values associated with the application words;
for each application, setting the additionally classified words as additional search keywords; and
identifying search result applications based on matches between terms of the search query and the additional search keywords associated with the search result applications.

11. The method of claim 10, further comprising identifying similar applications based on the similarity between the additionally classified words for the application and the additionally classified words for the similar applications.

12. A system comprising:
one or more storage devices configured to store application data for a plurality of applications, wherein the application data for each application specifies one of a plurality of application categories and includes application words that describe the application; and
one or more processing units that execute computer-readable instructions that cause the one or more processing units to:
determine a global fraction value, a category fraction value, and a ratio value for each of the application words, wherein the global fraction value indicates the fraction of applications in the plurality of applications that include the application word, wherein the category fraction value indicates the fraction of applications in the associated category that include the application word, and wherein the ratio value indicates the ratio of the category fraction value to the global fraction value for the application word;
classify application words as categorical words when the ratio value associated with the application words is greater than a ratio threshold;
for each application, identify similar applications based on similarity between the application words for the application and the application words for the similar applications;
for each application, set categorical words as categorical search keywords for the application when the categorical words are included in greater than a threshold number of similar applications;
receive a search query from a user device;
identify search result applications based on matches between terms of the search query and categorical search keywords associated with the search result applications; and
send search results to the user device including download links for the search result applications.

13. The system of claim 12, wherein the application words include an application title.

14. The system of claim 12, wherein the one or more processing units are configured to set categorical words as categorical search keywords for the application by adding categorical search keywords from similar applications.

15. The system of claim 12, wherein the one or more processing units are configured to identify similar applications by identifying similar applications in the same category based on the similarity between the categorical words in the application and the categorical words in the similar applications.

16. The system of claim 12, wherein the one or more processing units are configured to classify application words as categorical words when the ratio value associated with the application words is greater than the ratio threshold and the category fraction value of the application words is greater than a fraction value threshold.

17. The system of claim 12, wherein the one or more processing units are configured to:
classify application words as application-specific words when the global fraction value associated with the application words is less than a global fraction threshold value;
for each application, set application-specific words as application-specific search keywords for the application; and
identify search result applications based on matches between terms of the search query and application-specific search keywords associated with the search result applications.

18. The system of claim 17, wherein the one or more processing units are configured to identify similar applications for each application by:
identifying matches between the categorical words in the application and the categorical words in the similar applications; and
identifying matches between the application-specific words in the application and the application-specific words in the similar applications.

19. The system of claim 18, wherein the one or more processing units are configured to, for each application pair:
determine a first similarity value based on the identified matches between the categorical words;
determine a second similarity value based on the identified matches between the application-specific words; and
determine an application-pair similarity value for the application pair based on the first similarity value and the second similarity value.

20. The system of claim 12, wherein the identified similar applications include a predetermined number of the most similar applications.

21. The system of claim 12, wherein the one or more processing units are configured to:
classify application words into a plurality of additional classifications based on the ratio values associated with the application words;
for each application, set the additionally classified words as additional search keywords; and
identify search result applications based on matches between terms of the search query and the additional search keywords associated with the search result applications.

22. The system of claim 21, wherein the one or more processing units are configured to identify similar applications based on the similarity between the additionally classified words for the application and the additionally classified words for the similar applications.

* * * * *